(12) United States Patent
Benedict

(10) Patent No.: US 10,023,384 B2
(45) Date of Patent: Jul. 17, 2018

(54) OVERHEAD GUIDE TRACK SYSTEMS FOR AUTOMATED MATERIAL HANDLING AND STORAGE AND PARKING FACILITIES

(71) Applicant: BEC COMPANIES, INC., Tallahassee, FL (US)

(72) Inventor: Charles E. Benedict, Tallahassee, FL (US)

(73) Assignee: BEC COMPANIES, INC., Tallahassee, FL (US)

(*) Notice: Subject to any disclaimer, the term of this patent is extended or adjusted under 35 U.S.C. 154(b) by 0 days.

(21) Appl. No.: 15/505,365

(22) PCT Filed: Aug. 24, 2015

(86) PCT No.: PCT/US2015/046533
§ 371 (c)(1),
(2) Date: Feb. 21, 2017

(87) PCT Pub. No.: WO2016/029205
PCT Pub. Date: Feb. 25, 2016

(65) Prior Publication Data
US 2017/0240356 A1 Aug. 24, 2017

Related U.S. Application Data

(60) Provisional application No. 62/040,883, filed on Aug. 22, 2014.

(51) Int. Cl.
*B65G 1/04* (2006.01)

(52) U.S. Cl.
CPC ............... *B65G 1/0464* (2013.01)

(58) Field of Classification Search
CPC ............................................. B65G 1/0464
See application file for complete search history.

(56) References Cited

U.S. PATENT DOCUMENTS

| 1,577,394 | A | * | 3/1926 | Wehr | B66C 7/00 104/109 |
| 5,146,724 | A | * | 9/1992 | Angelo | F16B 2/02 248/228.1 |
| 2008/0213073 | A1 | * | 9/2008 | Benedict | B65G 63/004 414/279 |

* cited by examiner

*Primary Examiner* — Anna M Momper
*Assistant Examiner* — Ashley K Romano

(57) ABSTRACT

An overhead guide track system for automated material handling and storage facilities wherein at least one transfer unit is suspended from carriages that travel along the track system, the track system including a plurality of first and second support beams being assembled in an X-Y manner such that the first and second support beams intersect with one another in perpendicular relationship and wherein each of the first and second support beams includes a horizontal flange connected to a central vertical web, each of the vertical webs of the first and second beams having opposite ends connected to vertically oriented pedestals at a plurality of intersections of the first and second support beams and which pedestals support transfer plates over which the carriages are supported as the carriages pass over open gaps between the horizontal flanges at the intersections of the first and second support beams.

13 Claims, 10 Drawing Sheets

OVERHEAD GUIDE TRACK SYSTEMS FOR AUTOMATED MATERIAL HANDLING AND STORAGE AND PARKING FACILITIES

BACKGROUND OF THE INVENTION

Field of the Invention

This invention is generally directed to automated multi-directional material handling systems which may be used to selectively retrieve and discharge containers, supplies, cargo, vehicles, armaments, storage bins and the like, within storage facilities, automated parking facilities, warehouses, vessels at sea and the like, and wherein the systems include cost effective and rigorous overhead intersecting "I" beam overhead track support systems along which transfer units or vehicles may be operated to move materials and articles to house such materials and articles or transfer such material and article between ground and storage or port facilities and between different modes of transportation.

Brief Description of the Related Art

Overhead rail systems for supporting motorized and non-motorized vehicles or transfer units, for moving or transporting physical items or groups of items within warehouses, storage structures, vehicle parking or storage facilities, boat storage facilities, shipping or port handling and transfer facilities are known in the art. Such systems may include overhead open box beams such as described, by way of example, in U.S. Pat. Nos. 7,753,637, 7,850,412, 7,909,558 and 8,408,863 to Benedict et al, the entire contents of which are incorporated herein by reference.

Such overhead conveyor systems include load transfer or container carriers, commonly referred to as transfer units, TUs, which are suspended on carriages that are supported within open box beams. The TUs are suspended by shafts or yokes that extend through open channels or slots in lower surfaces of the hollow box beams. As described in the earlier U.S. Patents, one of the most efficient and economical manner of shipping goods over land and waterways is the use of standardized cargo or shipping containers. The containers are manufactured in standard sizes which are generally twenty or forty feet in length. The containers are specifically designed so that they may be loaded into the holds and on the decks of ocean going vessels, stored in land base warehouses and/or moved from the vessels or warehouses by use of either on-board or on-shore cranes which place the containers directly onto land transport vehicles such as railway cars and trucks. Conventional container ships, warehouses and the like include one or more hold or storage spaces which in some structures may be divided into a plurality of vertically tiered cells by vertical beams which act as guides for the corners of containers that are to be stacked one upon another within each cell. Typical cells may retain as many as six to ten or more stacked containers. In other structures, the storage spaces may be more open such that containers may be stacked one upon another without the vertical guide beams.

The same type of vertical storage cell structures, with and without the vertical guides, may be used in other environments such as in cities for high density automated parking facilities for vehicles, at docking areas for high density storage of boats and for the general storage of any type of goods and materials in warehouses and other storage systems wherein standardized containers may not be appropriate.

SUMMARY OF THE INVENTION

The present invention is directed to an automated material storage and retrieval handling system for use in manipulating and storing standardized and other types of cargo containers, support bins, trays, vehicles containers and the like within vertically oriented cells of a ship, warehouse and other storage facility such as used for vehicles including cars, trucks and buses, boat and shipping vessels, and other products wherein, the systems include overhead grid track structures which are securely mounted above storage cells and loading and discharging areas and which define intersecting and generally perpendicularly oriented tracks or rails on which are guided container transfer units, TUs. Each transfer unit is mounted by a plurality of carriages which are supported by the tracks such that the transfer units are suspended from the overhead tracks and are moveable in an X-Y manner so as to be positioned to place or withdraw containers or other articles or items from the cells.

The transfer units are conventionally powered by motors which power drive gear or wheel systems which are selectively engageable with the grid track system. The drive motors have anti-backdrive features such that when they are not powered, the motors act as locks to prevent movement of the transfer units.

The systems of the invention are designed to provide a space above an upper tier of each vertical storage cell which is large enough for the transfer units to maneuver while suspending a hoist line, spreader beam or the like, there from, such that containers or other objects may be manipulated throughout the grid system and moved from one cell area to another beneath the overhead track system but above the storage cells.

The systems of the invention also reduce the amount of effort and manual labor which is necessary to access storage containers, vehicles, supplies, components and the like and permit movement of multiple containers within an area below a deck or ceiling of a structure but above the cell structures such that the containers or other objects may be interchangeably manipulated from space to space.

A primary object of the present invention to provide an automated material handling, retrieval and storage system for warehouses, parking and boat storage buildings, and container ships and the like which allows such structures to operate at an optimum capacity for a given area or "foot print" such that a maximum number of articles, containers or devices may be stored and/or retrieved from such storage facilities.

It is also an object of the present invention to provide material handling, retrieval and storage systems for standardized and other international and local cargo containers which enables specific containers to be retrieved from any level of a multi-tiered vertical cell structure and maneuvered throughout the structure in X-Y motions such that a plurality of transfer units may simultaneously operate within a given system.

It is yet a further object of the present invention to provide an overhead grid track system for supporting motorized and non-motorized load transfer units which are provided with load elevating and lowering systems, such as spreader beam-like structures, hoists, winches and other lifts which are suspended from crane or cable devices and wherein the tracks of the system are formed of steel "I" beams which are joined by welding, and sometimes bolted to one another, to form generally perpendicularly intersecting tracks upon which the transfer units are movably supported.

It is another object of the present invention to provide a structural grid track rail structure which may be economically constructed from steel "I" beams by modification of the "I" beam X and Y flange structures and by providing load transfer units that are capable of moving across open intersections formed at each area where X and Y "I" beams intersect with one another.

It is another object of the present invention to reduce the costs associated with the construction and maintenance of overhead grid track systems by using more economical, lighter weight and readily available steel "I" beams to form X-Y grids upon which transfer vehicles may be moved and wherein the "I" beams provide greater strength and thus less deflection and less fatigue problems when compared to more convention hollow box beams.

An additional object of the invention is to facilitate combining the grid track system into and part of the actual support structure so that the entire hollow box beam grid track system is eliminated which dramatically reduces the supported weight and therefore the system cost.

It is also an object of the invention to facilitate the maintenance of carriages that support transfer units from overhead grid track systems by allowing immediate access to the carriages and components thereof such as motors, bearings, rollers, spherical ball supports, as well as allowing open inspection of the members of the grid track system to prevent damage and possible failure of the grid track structure from metal fatigue over time.

BRIEF DESCRIPTION OF THE DRAWINGS

A better understanding of the invention will be had with respect to the accompanying drawings wherein.

DESCRIPTION OF THE PREFERRED EMBODIMENT

Figure 1:
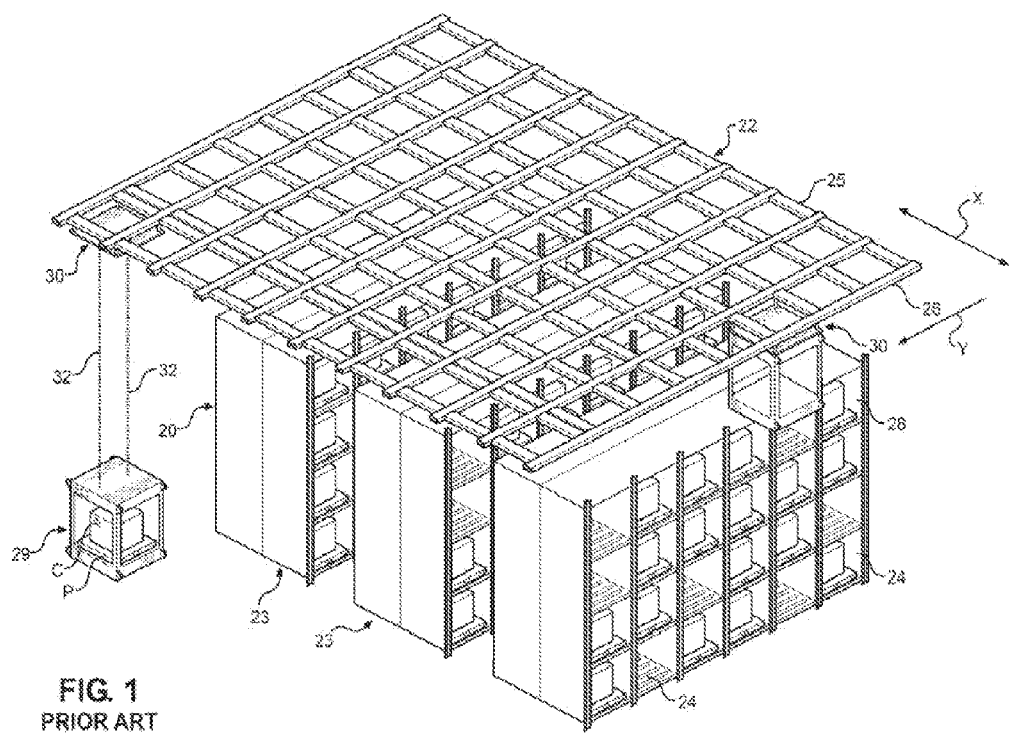
FIG. 1 is a top perspective view of a prior art overhead grid track system shown mounted above a plurality of vertically stacked storage cells which are open toward isles intermediate rows of the storage cells and wherein one or more transfer units are mounted to travel along intersecting hollow open box beams and wherein the transfer units raise and lower carriers retaining goods to be placed into and/or removed from the storage cells.

With specific reference to FIG. 1 of the drawing figures, the system of the present invention will be described in association with, or use with, a storage warehouse or building 20 of the prior art. It should be noted that the system may be used in other environments such as mini-warehouses, distribution warehouses, garages, ships and the like. The building is divided into a plurality of rows 23 of vertically tiered cells 24. The cells are defined by vertically and horizontally extending steel beams. In this embodiment, the cells are open horizontally, such as at 28, to receive goods or containers "C" carries by pallets "P" which are carried by elevating devices 29 connected by cables 32 to a load transfer vehicle or unit 30 that is movably linearly in X and Y directions along an overhead grid track system 22 formed of hollow open box beams as taught in the prior art. The grid includes open box beams 25 extending in an X direction and intersecting open box beams 26 extending in a Y direction.

Figure 3:
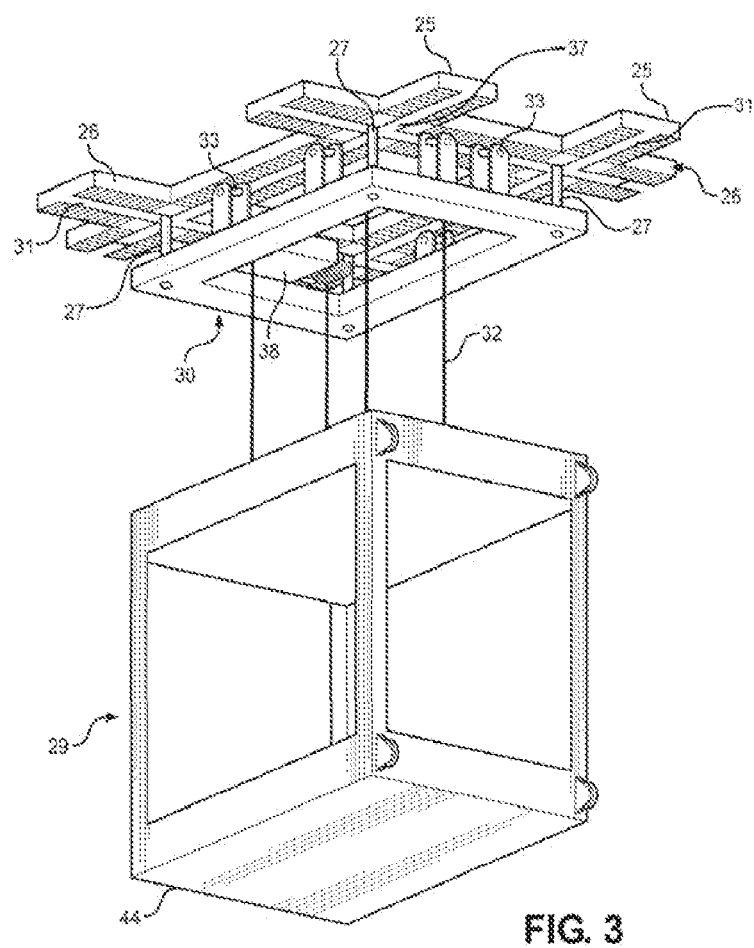
FIG. 3 is an enlarged perspective view of the prior art transfer unit shown in FIG. 1 suspended from suspension pins extending through central open slots from four carriages mounted within the hollow box beams of the overhead grid track system.

With reference to FIG. 3, the transfer unit 30 is suspended from pairs of parallel and adjacent beams 25 and 26 by spindles 27 extending through open slots 31 in the lower surfaces of the box beams 25 and 26. The spindles are mounted to carriages 35, see FIGS. 4 and 5, which are movable within the box beams. Generally, four carriages are connected to each transfer unit such that the transfer unit is supported on two adjacent X beams 25 and two adjacent Y beams 26 which are oriented so as to intersect with one another in generally perpendicular relationship at open intersections 37. Each transfer unit, see FIGS. 1 and 3, includes hoists 38, for controlling the cables 32 that are used to raise and lower pallets or objects 29 that are to be aligned with the cells 24 in order to transfer articles or objects to and from the transfer units and the cells.

Figure 2:
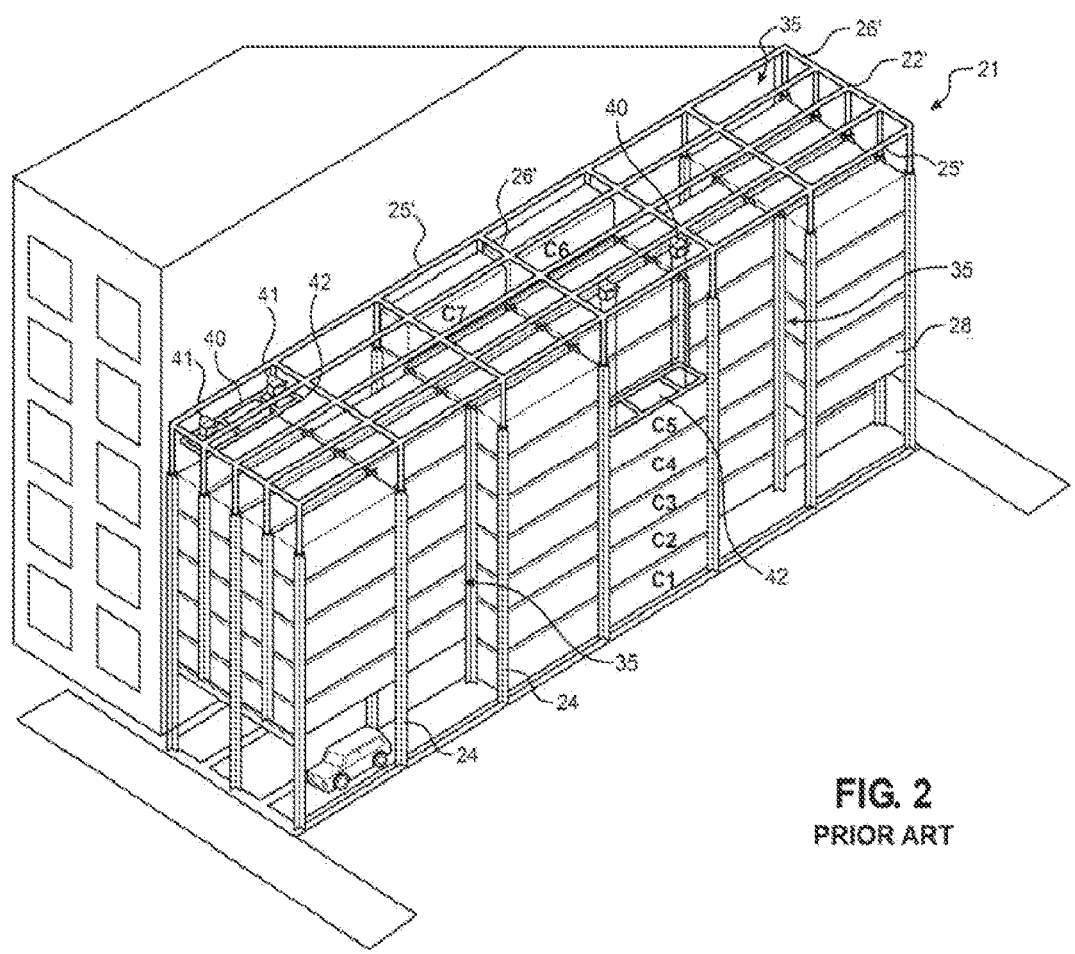
FIG. 2 is a top perspective view of another prior art overhead hollow box beam grid track system, similar to FIG. 1, shown mounted above a plurality of vertically oriented storage cells that are open vertically to receive containers, pallets and other enclosures for storing goods and products and wherein one or more transfer units are mounted to travel along intersecting hollow open box beams and wherein the transfer units raise and lower containers retaining goods to be placed into and/or removed from the storage cells.

With reference to FIG. 2, the grid track system of the present invention may also be used with overhead storage system 21 having a plurality of vertically open storage cells 35 in which a plurality of containers "C1-C7" may be stacked one upon another in closely spaced side-by-side relationship to maximize the storage capacity of a building or vessel. As with the system of FIG. 1, the containers are transported along an overhead grid track system 22' formed of intersecting X and Y oriented hollow open box beams 25' and 26', which are similar to those described with respect to the embodiment of FIG. 1, by load transfer vehicles or units 40. In this embodiment, the units 40 may be of a size to allow the conventional and standardized cargo or international shipping containers "C1-C7" to be transfer into and from each cell in a conventional manner well known to those in the art. In some instances, the cells will be dimensioned to accommodate other sizes of items to be stored or temporarily housed, such as for support trays and the like upon which vehicles or boats may be supported, such as in high density automotive vehicle parking garages. The grid track system 22', which is used to support movable transfer units 40, is provided above the cells and is spaced above the highest cell in each vertically array of cells a distance to allow passage of the transfer unit 40 and any object supported thereby to move over the cells. Each transfer unit includes hoists 41 for raising and lowering a container engagement structure, such as a conventional spreader beam 42 that supports one of the containers "C1-C7" as it is lowered or raised from the cells 35.

Similar to the structure shown in FIG. 3, the transfer unit 40 is suspended from pairs of parallel and adjacent beams 25' and 26' by spindles 27 extending through open slots 31 in the lower surfaces of the box beams 25' and 26'. The spindles are mounted to carriages 35, see FIGS. 4 and 5, which are movable within the box beams. The transfer units 40 include drive gears or wheels driven by on-board motors to move the units along the box beams 25' and 26'.

Figure 4:
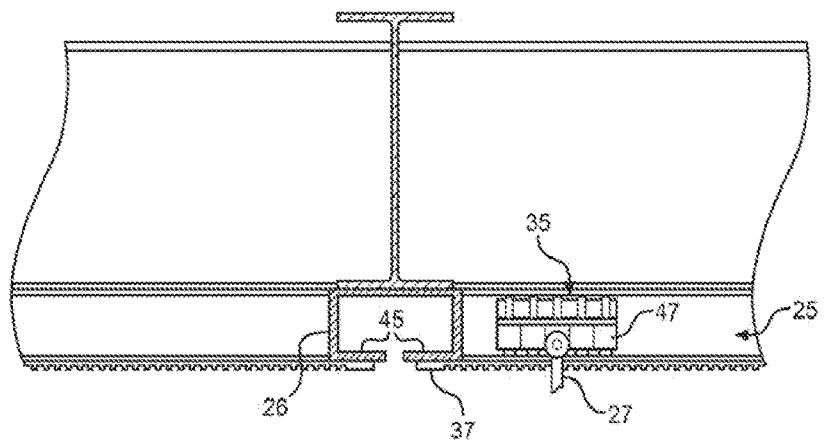
FIG. 4 is a cross sectional view through two intersecting open box beams of the overhead grid track system shown in FIG. 3 and showing a prior art support carriage mounted within one of the intersecting hollow box beams and showing the open channel in the other of the intersecting open box beams of the grid track system.
Figure 5:
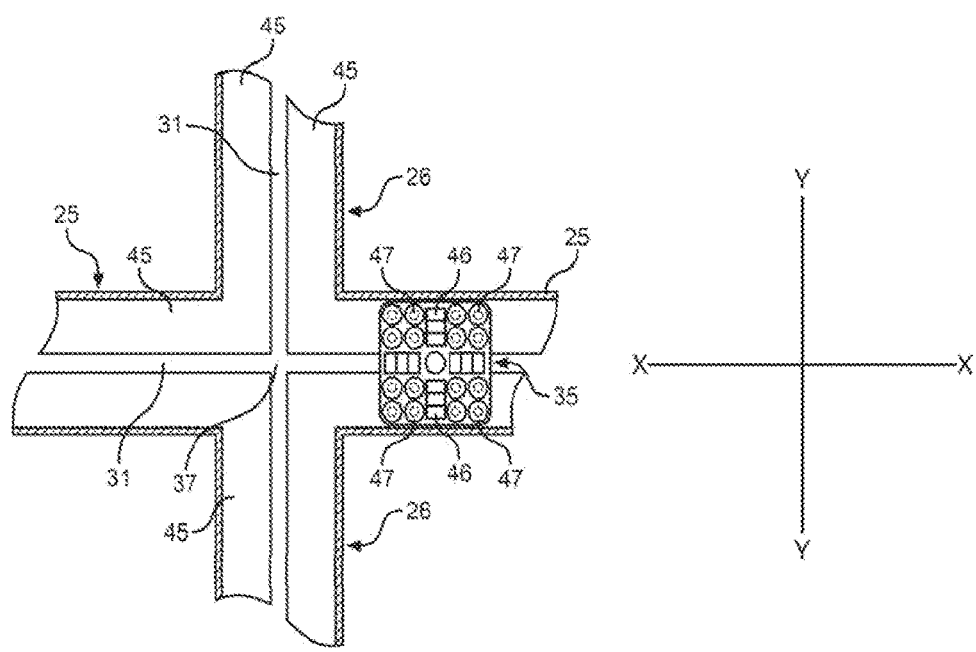
FIG. 5 is a top cross sectional view showing the prior art carriage of FIG. 4 mounted within the open box beam of the prior art grid track system.

With specific reference to FIGS. 4 and 5, a portion of a conventional hollow box grid track system is shown. The grid track system includes intersection X and Y open box beams forming guide tracks 25 and 26, or 25' and 26', respectively. The at least one movable transfer unit 30, or 40, is mounted to move in an X-Y motion along the track system and is supported by carriages 35 that are supported on upper surfaces of lower horizontal flanges 45 of the box beams by directional rollers 46 and spherical rollers 47.

As previously described, in accordance with the teachings of the invention, plural transfer units may operate within the grid track system of the present invention thereby enabling containers to be shuffled simultaneously within the open areas defined above the upper tier level of the cells within a building or other structure.

The system of the present invention may be fully automated and interfaced with an inventory control system so that each transfer unit is directed to a given cell and to a given container location within the storage area by multiplexing a command signal from the inventory control system through a power raceway grid wiring.

Utilizing such a system, a designated container may be automatically located and containers above the designated container may be moved appropriately and, thereafter, relocated once the designated container has been retrieved utilizing the transfer units and their hoist mechanisms.

As previously noted, problems exist in overhead grid track systems for supporting transfer vehicles such as 30 and 40 relative to the storage cells and loading and off-loading areas. First, the open box beams are costly to form and are difficult to inspect to insure that the open box beams are not fatigued or cracked which can result in a break down in the system operation. Often cracks or defects occur within the box structures and thus are not readily evident to technicians, mechanics or inspectors. Also in order to maintain the support carriages 35 within the box beams, the carriages must be removed which considerably increases maintenance expenses.

Figure 8:
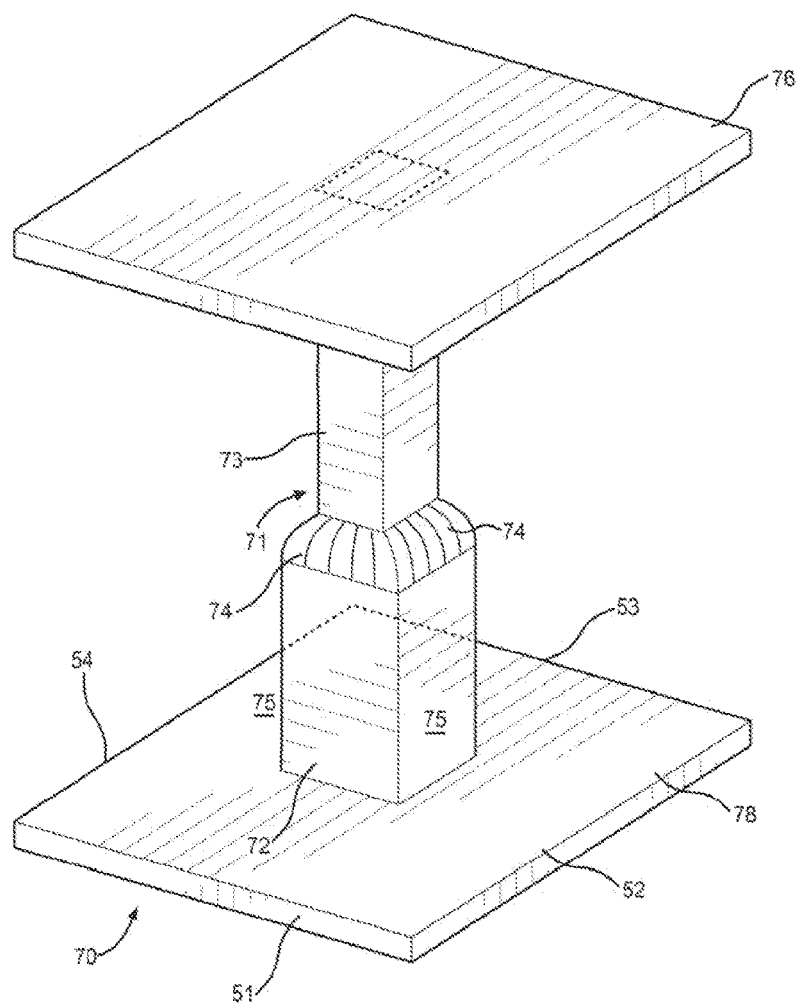
FIG. 8 is a perspective of a pedestal connector for connecting the ends of two X oriented "I" beams and two Y oriented "I" beams in perpendicular relationship with one another in order to create open intersections in an overall overhead grid track system using multiple connected X and Y "I" beams in accordance with the teachings of the invention.
Figure 9:
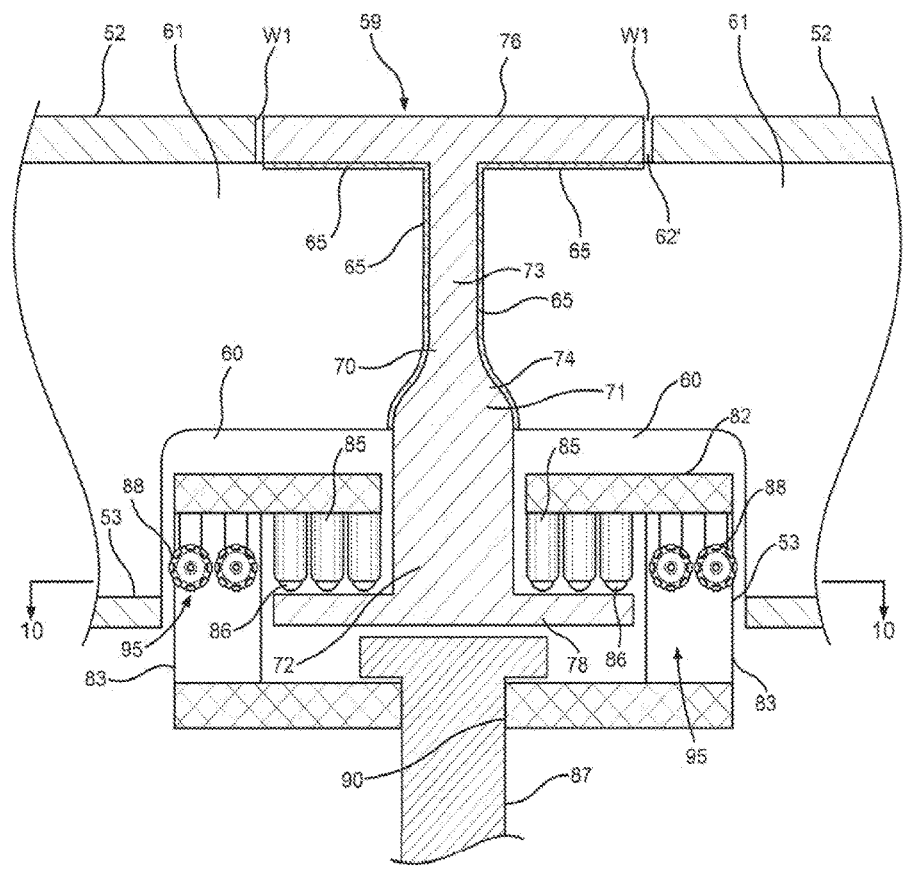
FIG. 9 is a cross sectional view showing the pedestal connector of FIG. 8 welded between abutting Y and X "I" beams of the grid track structure of the invention and showing a carriage for supporting a load transfer unit from the "I" beam track structure at an intersection of then beams.
Figure 10:
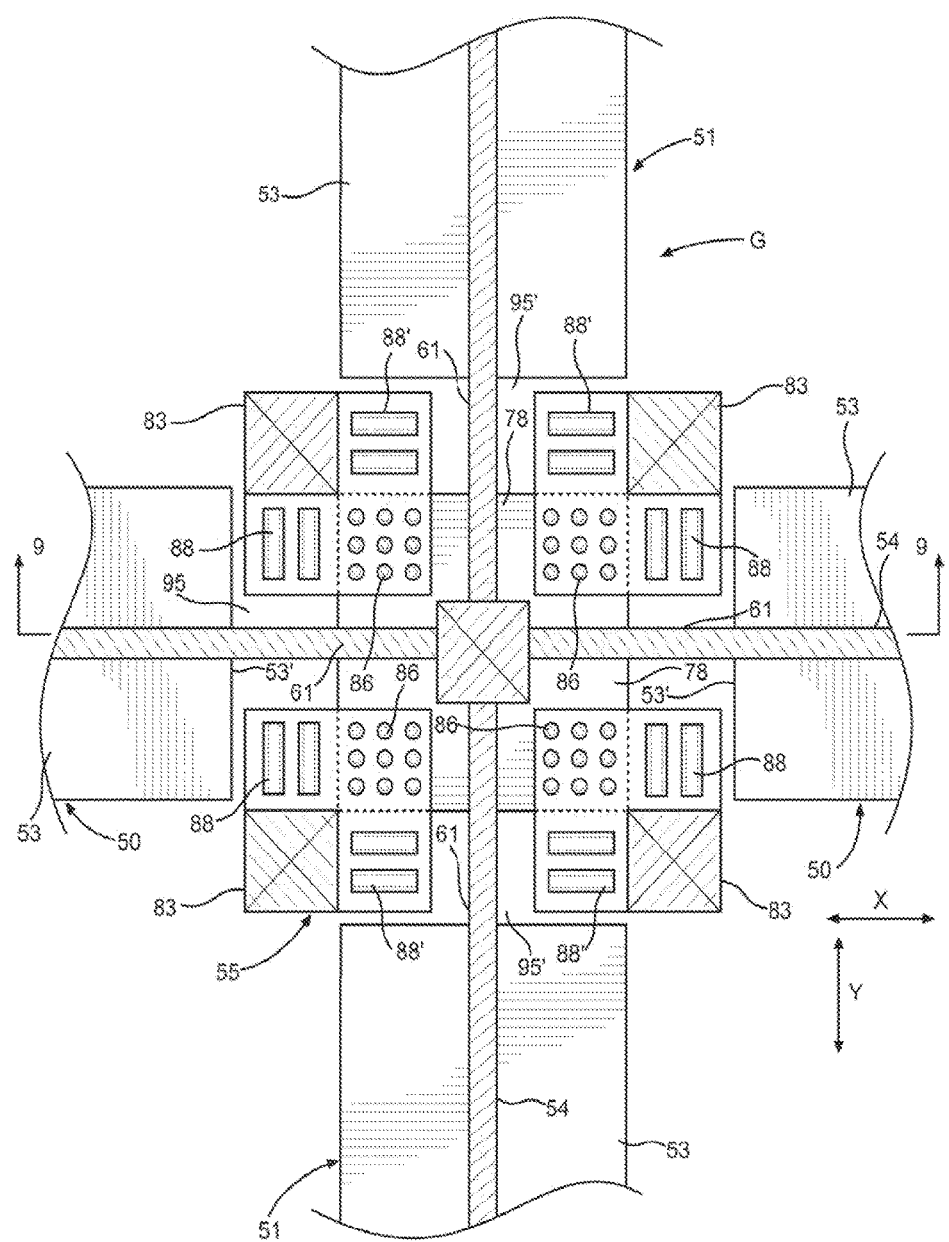
FIG. 10 is a cross sectional view taken along line 10-10 of FIG. 9 showing the bi-directional and spherical rollers for supporting the carriage of FIG. 9 on the upper surfaces of the lower horizontal flanges of the "I" beams forming the overhead grid track structure of the invention.

With particular reference to FIGS. 6-13, the specifics of the overhead grid track system of the present invention will be described in detail. Unlike the prior art overhead grid track structures shown in FIGS. 1-5 using open hollow box beams to form the grid track system, with the present invention, the grid track system is formed of steel "I" beams 50 and 51 that are welded and/or bolted to one another in intersecting X-Y patterns. With reference to FIG. 10, the "I" beams 50 extend in an X direction and the "I" beams 51 are shown extending in a Y direction, although the directions may be reversed. Each "I" beam includes upper and lower horizontal flanges 52 and 53 that extend outwardly at right angles to a central vertical web 54. Each of the carriages 55 for supporting the transfer units of the invention are designed to be supported on the upper surfaces of the lower flanges 53, respectively, of the "I" beams 50 and 51 on opposite sides of the center vertical webs 54 of each "I" beam 50 and 51, respectively.

The use of "I" beams to form the overhead grid track structure "G", see FIG. 10, enhances a mechanic's accessibility to the carriages 55 associated with each transfer unit and thus makes maintenance and repair of the carriages much easier and more efficient and less costly than is possible using the enclosed hollow box beam structures of the prior art. Also, the use of "I" beams reduces the costs associated with the construction and maintenance of overhead grid track systems by using more economical, lighter weight and readily available steel "I" beams to form the X-Y grids upon which the transfer vehicles will be moved as part of the support structure. The "I" beams provide greater strength and thus less deflection and less fatigue problems when compared to more convention hollow box beams used in the prior art discussed above. By having the beam structures open for readily viewable inspection, any cracking or indications of failure or fatigue of the "I" beams may be quickly determined so that corrective action or repair can be done before a complete failure of the "I" beams thus resulting in a safer and more reliable track system for supporting the transfer units or vehicles, such as 30 and 40, that will be used on the grid track structure of the present invention.

To permit passage of the carriages at each intersection 59 between the "I" beams of the present invention that are assembled in a X-Y plane with the beams at generally right angles relative to one another, the structure of the "I" beams must be altered. In this respect, with particular reference to FIGS. 6 and 7, the webs 54 and the ends of the lower flanges 53 of each "I" beam 50 and 51 are formed having a lower cut-out or open portion 60 wherein the lower horizontal flange 53 includes a leading edge 53' that terminates short of a leading edge 52' of the upper horizontal flange 52, which edge 52' is shown as terminating short of an extended upper portion 61 of the web. The openings 60 of the central web 54 of each "I" beam are removed to provide clearance for passage of the carriages 55. Further, when the beams are welded in assembled relationship in an X-Y pattern, the openings 60 will be provided in both the X and Y directions such that the carriages may move linearly along the "I" beams 50 and 51 at all intersection thereof.

Figure 6:
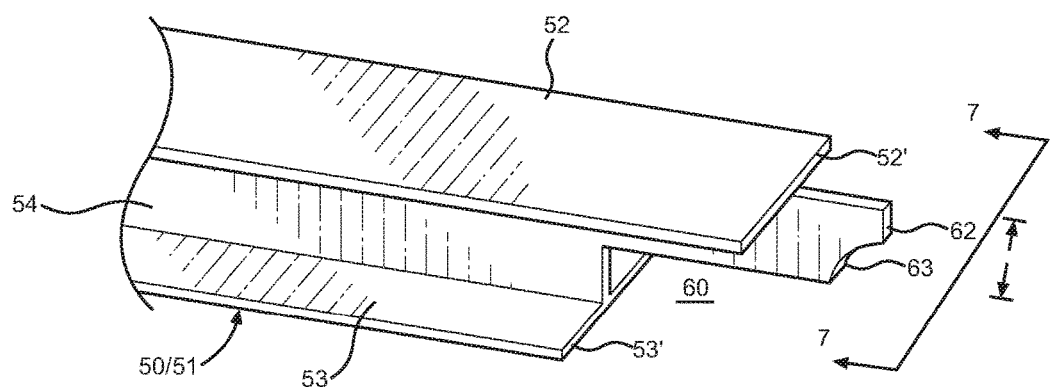
FIG. 6 is a partial perspective view of one of the "I" beams forming the intersecting overhead grid track system of the present invention and which may be used to replace the open box beams of the prior art for the reasons set forth herein.
Figure 7:
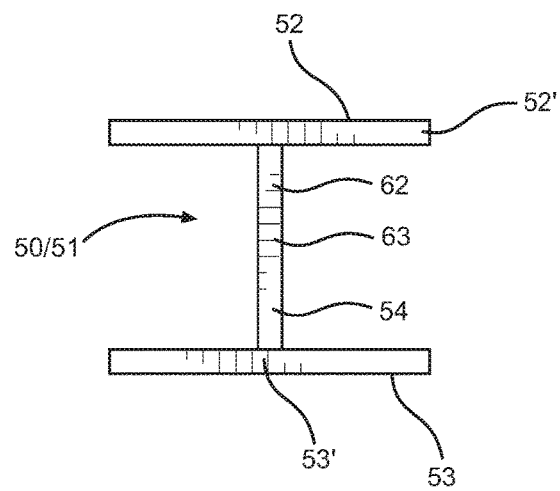
FIG. 7 is an end view of the "I" beam of FIG. 6 taken along line 7-7 of FIG. 6.

To securely connect the intersecting "I" beams 50 and 51 to one another in the desired X-Y grid pattern, the web 54 of each "I" beam must be at least welded or otherwise secured to the web 54 of the mating or intersecting "I" beam. With the present invention, at each intersection 59 of the X-Y "I" beams, and as shown in FIG. 9, portions of the upper and lower horizontal flanges 52 and 53 are recessed inwardly of the projecting ends 61 of the central vertical webs 54 of each "I" beam. Also, as shown in FIG. 6 the front face 62 of each projecting end 61 of each central vertical web includes a concavely shaped lower free end portion 63 for purposes of facilitating seating of the "I" beams against supporting surfaces of a support pedestal 70, see FIGS. 8 and 9 to which the vertical webs 54 of each X and Y oriented "I" beam will be welded as shown by dark weld lines 65 in FIG. 9.

With continued reference to FIG. 9, at each intersection 59 of the X-Y "I" beams, two pair of opening areas must be provided for passage of the carriages 55 that support the more conventional transfer units as discussed above and as described in the prior art. The carriage openings are created by aligning the openings or cut-out portions 60 of each "I" beam on opposite sides of the centralized support pedestal 70. The pedestal is shown in FIG. 8 as including a central vertically oriented body 71 which is general enlarged and squared at a lower end 72 thereof and which is integrally formed with an upper end 73 of lesser cross sectional dimension and wherein an outwardly arched or convex surface 74 is formed as a transition area along each of the four sides 75 of the pedestal. The curvature of the transition areas is provided to provide complementary shaped seating surfaces to support the arcuate free ends 63 of the extended portions 61 of the central vertical webs 54 of each of the four "I" beams being connected at each intersection 59 of the grid track system.

Each pedestal also includes an upper steel plate 76 which is of a size to cooperatively be seated between a recessed area 77 created between the leading edges 52' of each of the upper flanges 52 of the "I" beams, as shown in FIG. 9. In this respect, the upper steel plates are generally the same thickness as the thickness of the upper flanges 52 of the "I" beams and the plates 76 may be welded to the edges 52' of the flanges 52 as shown at W1. Each pedestal also includes a lower steel transfer plate 78 which is integrally formed or welded to the bottom of the lower portion 72 of the body 71 and which is generally square, having four sides S1, S2, S3 and S4. The transfer plate is of a dimension to fit within the open areas 60 defined between the opposing ends 53' of the lower flanges 53 of each of the beams 50 and 51 in order to create four spaced open passages 95 and 95' between the ends 53' of the lower flanges of the X and Y beams and the four sides of the transfer plate for passage of a support frame 80 of the carriages 55, as will be described below. Also, the upper steel plate 76 of each pedestal may be welded or integrally formed with the body of the pedestal. In FIG. 9, both the upper plate 76 and the lower transfer plate 78 are shown as be integrally formed with the body of the pedestal.

Figures 11, 12:
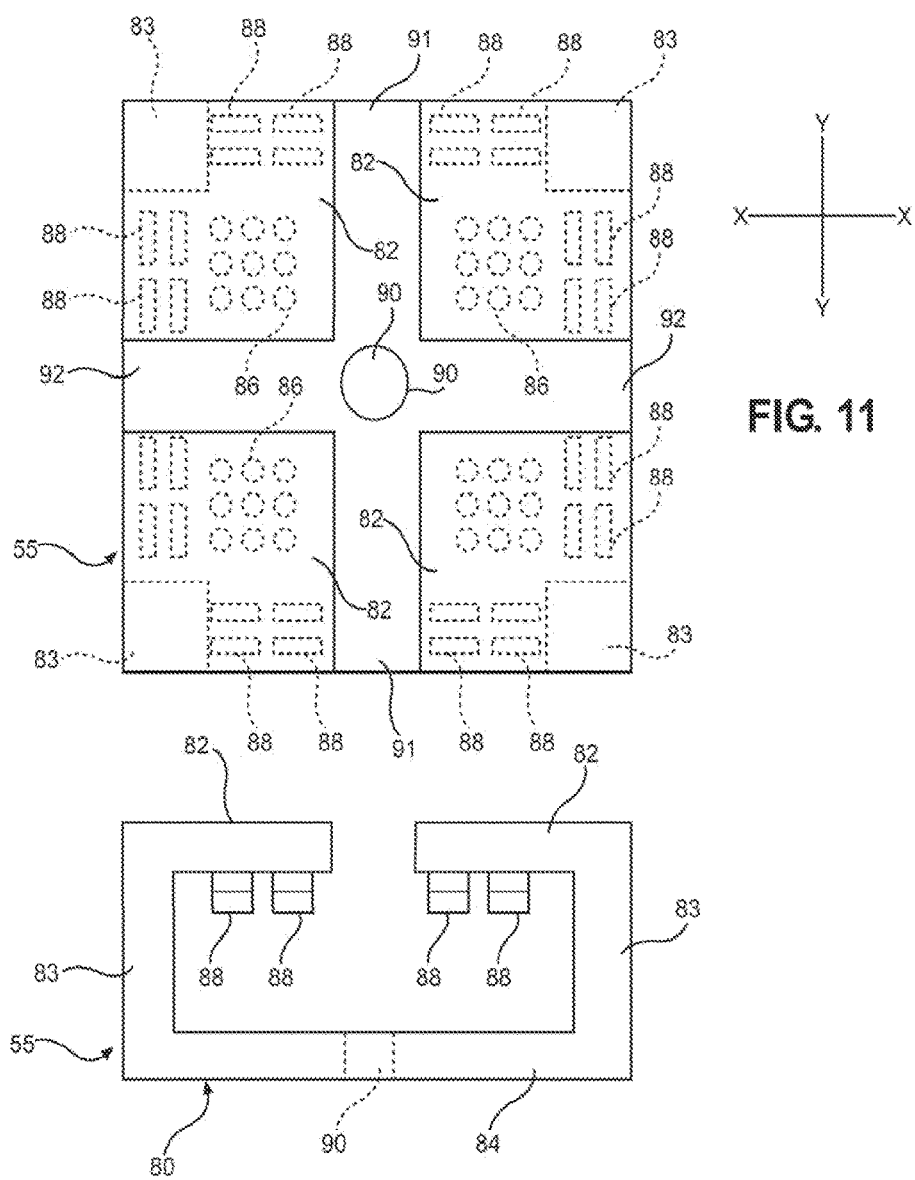
FIG. 11 is a view similar to FIG. 10 but only showing portions of the support carriage.
FIG. 12 is a side view of the carriage of FIG. 11 taken along line 12-12 of FIG. 11.
Figure 13:
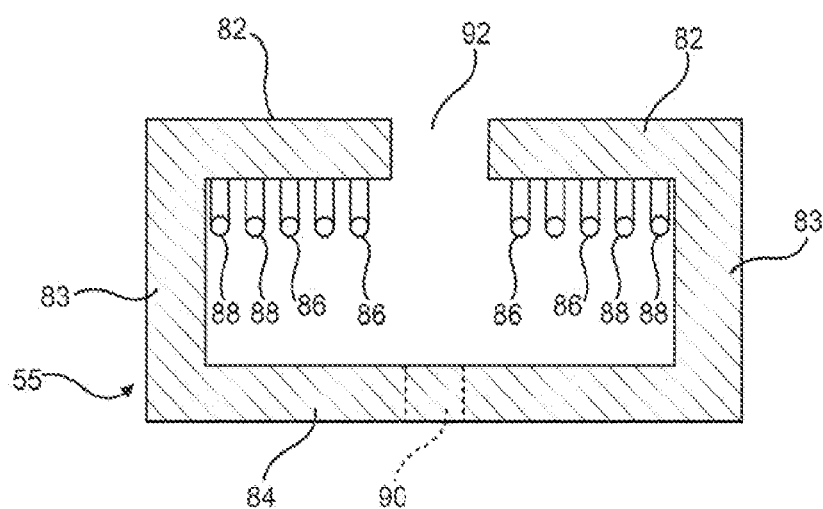
FIG. 13 is a cross sectional view taken along line 13-13 of FIG. 11.

With reference to FIGS. 11-13, one of the support carriages 55 for carrying one of the transfer units 30 and 40, or other similar transfer units, is shown in greater detail. FIG. 11 is a top plan view of the carriage 55 showing four spaced upper corner plates 82, shown in full lines, that are mounted and secured to four posts 83 that connect the upper plates to a generally solid base 84 having a central opening 90 therein for passage of a T-shaped pin 87 that connects the carriage 55 to a transfer unit. The frame of each carriage formed of the plates, posts and base are preferably formed of steel to provide for maximum support strength. The upper part of the frame of the carriage also defines open channels 91 and 92, see FIG. 11, that allow passage of the carriage about the pedestal 70. As previously described, normally four carriages are used to support or suspend each transfer unit, such as 30 and 40, to pairs of spaced "I" beams 50 and 51.

Mounted to the bottom of each of the plates 82 are a plurality of sockets 85 in which spherical ball rollers 86 are carried for supporting the carriage 55 on the upper surfaces of the lower flanges 54 of each of the "I" beams 50 and 51 and on the transfer plate 78 of the pedestal 70. In the drawings, nine spherical ball rollers are mounted on each plate 82, however, the number may be varied. The spherical ball rollers are heavy industrial rollers capable of supporting significant weight as the carriages may be supporting tons of weight during use of the storage system. Also mounted to the lower surface of the plates 82 are two sets of spaced directional elongated rollers 88. With reference to FIG. 13, the directional rollers 88 have their elongated axes oriented so that the rollers are used to support the carriage in an X direction and the directional rollers 88' are used to support the carriage in a Y direction as the carriage moves along the lower flanges 53 of the "I" beams of the grid track system. Again, the number of rollers may be changed and remain within the teachings of the present invention. As shown in FIGS. 9 and 10, the sets of rollers 88 used to support the carriage on the X "I" beams 50 pass through the open spaces 95 formed between the transfer plate 78 and the edges 53' of the spaced "I" beams as the carriage moves in a Y direction in FIG. 10. When the carriage moves in an X direction at an intersection 59, the set of rollers 88' for supporting the carriage along the flanges 53 of the "I" beams 51 will pass through the openings 95'. The spherical ball rollers 86 and the directional rollers 88 are shown in dotted line in FIG. 11.

From the foregoing, the grid track system of the present invention allows more conventional steel "I" beams to be modified without loss of strength and to be assembled at generally perpendicular intersections of X-Y directional rails or tracks in such a manner that the intersections are reinforced by the central pedestals 70 by welding of the upper flanges 52 and webs 54 to the body 71 and upper plate 76 of the pedestal as shown in FIG. 9. FIG. 9 also exemplifies how one of the carriages for supporting transfer units to the grid track system of the invention may pass by the centralized reinforcing pedestals 70.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

I claim:

1. An overhead guide track system for automated material handling and storage facilities wherein at least one transfer unit is suspended from carriages that travel along the track system so that the transfer unit moves objects to and from vertically oriented storage cells, the track system comprising a plurality of first and second "I" beams being assembled in an X-Y manner such that the first and second "I" beams intersect with one another in perpendicular relationship and wherein each of the first and second "I" beams includes upper and lower horizontal flanges connected by a central vertical web, each of the first and second "I" beams having opposite ends, the opposite ends of a plurality of the first "I" beams being connected at a plurality of intersections of the first and second "I" beams to ends of a plurality of the second "I" beams in such a manner as to provide a clearance space between the opposing ends of the first and second "I" beams of a size to permit the carriages to pass there between as the transfer unit moves along the track system.

2. The overhead guide track system for automated material handling and storage facilities of claim 1 wherein the carriages are supported on upper surfaces of the lower flanges of each of the plurality of first and second "I" beams.

3. The overhead guide track system for automated material handling and storage facilities of claim 2 including a support pedestal provided at each intersection of the ends of the plurality of first and second "I" beams, wherein the ends of the plurality of the first and second "I" beams are connected to the support pedestal.

4. The overhead guide track system for automated material handling and storage facilities of claim 3 wherein an extended portion of the central web of each of the plurality of first and second "I" beams extends outwardly beyond the upper and lower flanges in a longitudinal direction of the beams.

5. The overhead guide track system for automated material handling and storage facilities of claim 4 wherein the extended portions include a contoured surface for cooperatively seating upon a complementary surface of an adjacent pedestal.

6. The overhead guide track system for automated material handling and storage facilities of claim 5 wherein end edges of the lower flanges are spaced at a greater distance from the contoured surface of the extended portion of the web than end edges of the upper flanges of the plurality of first and second "I" beams.

7. The overhead guide track system for automated material handling and storage facilities of claim 6 wherein each pedestal includes a vertical body, an upper plate for mounting between end edges of the upper flanges of opposing of the first and second "I" beams.

8. The overhead guide track system for automated material handling and storage facilities of claim 6 wherein each pedestal includes a vertical body and a lower transfer plate connected to a lower portion of the body and extending toward the edges of the adjacent lower flanges of the first and second "I" beams and being of a size to be spaced therefrom to form gaps for passage of portions of the carriage there through.

9. An overhead guide track system for automated material handling and storage facilities wherein at least one transfer unit is suspended from carriages that travel along the track system so that the at least one transfer unit moves objects to and from vertically oriented storage cells, the track system comprising a plurality of first and second support beams being assembled in an X-Y manner such that the first and second support beams intersect with one another in perpendicular relationship and wherein each of the first and second support beams includes a horizontal flange connected to a central vertical web, each of the first and second beams having opposite ends, the opposite ends of a plurality of the first support beams being connected at a plurality of intersections of the first and second support beams to ends of a plurality of the second support beams in such a manner as to provide a clearance space between the opposing ends of the first and second support beams of a size to permit the carriages to pass there between as the transfer unit moves along the track system.

10. The overhead guide track system for automated material handling and storage facilities of claim 9 including a support pedestal provided at each intersection of the ends of the plurality of first and second support beams, wherein the ends of the plurality of the first and second support beams are connected to the support pedestal.

11. The overhead guide track system for automated material handling and storage facilities of claim 10 wherein an extended portion of the central web of each of the plurality of first and second support beams extends outwardly beyond the horizontal flange in a longitudinal direction of the beams.

12. The overhead guide track system for automated material handling and storage facilities of claim 11 wherein the extended portions include a contoured surface for cooperatively seating upon a complementary surface of an adjacent pedestal.

13. The overhead guide track system for automated material handling and storage facilities of claim 10 wherein each pedestal includes a vertical body and a lower transfer plate connected to a lower portion of the body and extending toward edges of the horizontal flange of the first and second support beams and being of a size to be spaced therefrom to form gaps for passage of portions of the carriage there through.

\* \* \* \* \*